Dec. 8, 1959     G. M. GAULD     2,916,299
PEDAL EXTENSIONS FOR VELOCIPEDES
Filed Jan. 8, 1958
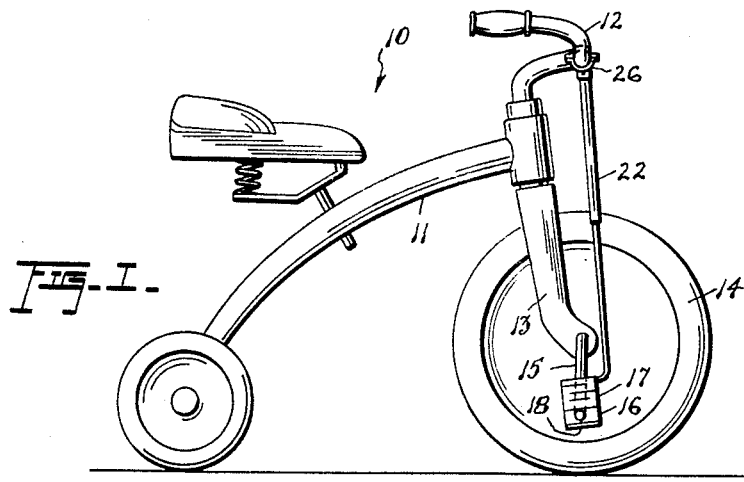
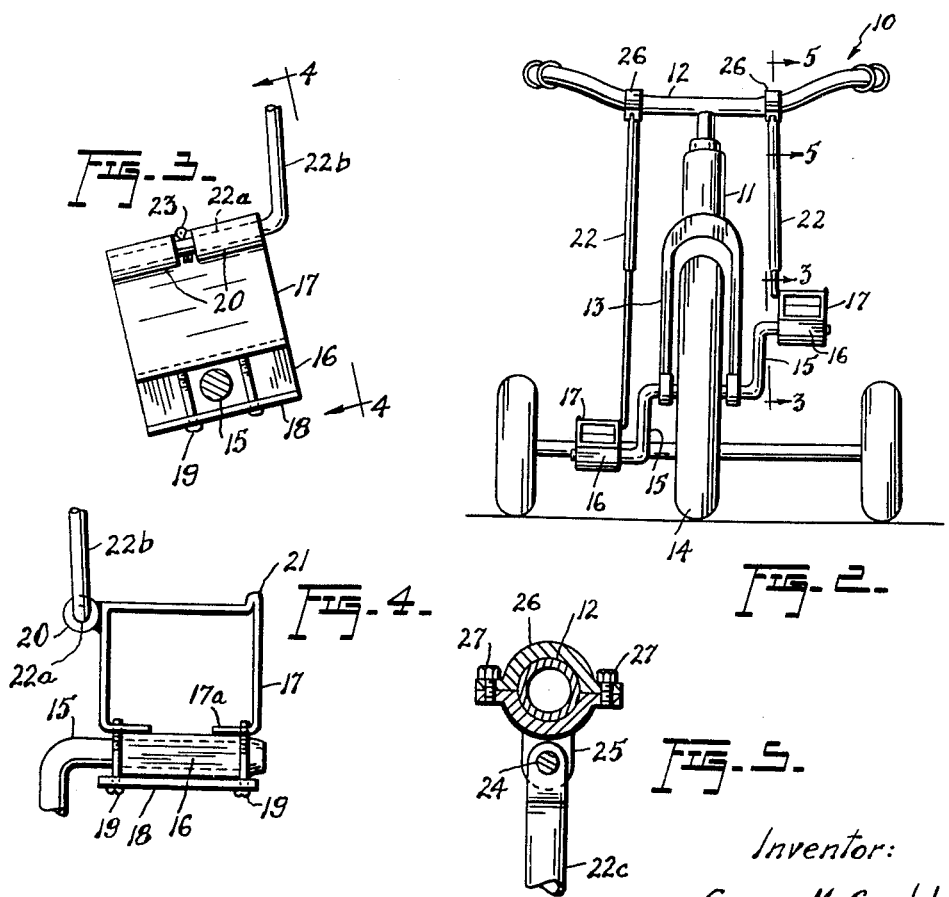
Inventor:
George M. Gauld

United States Patent Office 2,916,299
Patented Dec. 8, 1959

2,916,299

PEDAL EXTENSIONS FOR VELOCIPEDES

George M. Gauld, Caro, Mich.

Application January 8, 1958, Serial No. 707,756

5 Claims. (Cl. 280—259)

This invention relates to new and useful improvements in what may be called pedal extensions for tricycles, bicycles and other velocipedes, the function of such extensions being to permit small children to properly reach and operate the pedals of a velocipede which is somewhat too large for their size.

With fast growing children it is customary for parents to purchase somewhat oversize velocipedes in relation to the immediate requirements of the child, so that the child does not outgrow the velocipede too quickly but may effectively use the same over a span of a year or more. Under such conditions the child usually has difficulty in reaching and operating the pedals of the oversize vehicle and several devices have been invented to function as pedal extensions and allow the child to properly reach the pedals. Such devices are usually in the form of blocks which are secured to opposite sides, that is, top and bottom of the pedals and, by increasing the pedal thickness, the extensions are within proper reach.

While such devices are generally satisfactory for the purpose for which they are intended, they possess an inherent disadvantage which arises from the fact that the increased thickness of the pedals necessarily decreases the clearance which otherwise exists between the pedals and the ground, whereby obstructions are often encountered which hinder the operation of the velocipede. In this connection it may be noted that the pedals are rotatably mounted on the usual driving cranks of the velocipede and that it is therefore necessary to apply the extensions to both the top and bottom of the pedals so that the extensions may be contacted by the feet of the rider regardless of how the pedals are turned on the cranks.

The present invention completely eliminates the disadvantage above outlined, the principal object of the invention being to provide the required extension of the pedal without sacrificing ground clearance.

With the thought that regardless of the position of the pedal on its driving crank, it is only the top of the pedal which is contacted by the foot of the rider, an important feature of the invention resides in providing the extensions only on top of the pedals so that the ground clearance under the pedals is not affected by the use of the invention.

Another important feature of the invention resides in the provision of means for restraining the extensions and the associated pedals so that the pedals are at all times retained in such position that the extensions are at the top thereof, always in readiness for contact by the rider's feet.

Some of the advantages of the invention reside in its very simple construction, in its efficient operation, in its adaptability to velocipede pedals of various sizes and types, and in its adaptability to economical manufacture.

With the foregoing more important objects and features in view and such other objects and features as may become apparent as this specification proceeds, the invention will be understood from the following description taken in conjunction with the accompanying drawing, wherein like characters of reference are used to designate like parts, and wherein:

Figure 1 is a side elevational view of a velocipede, specifically, a tricycle, showing the invention applied thereto;

Figure 2 is a front elevational view of the same;

Figure 3 is a sectional detail on an enlarged scale, taken in the plane of the line 3—3 in Figure 2;

Figure 4 is an elevational view, taken substantially in the plane of the line 4—4 in Figure 3; and Figure 5 is a fragmentary sectional detail, taken substantially in the plane of the line 5—5 in Figure 2.

Referring now to the accompanying drawing in detail, the general reference numeral 10 designates a conventional velocipede, in this instance a tricycle, although it is to be understood that the invention may be also used on bicycles, unicycles and other like velocipedes.

The vehicle 10 includes the usual frame 11, handle bars 12 connected to a wheel fork 13 accommodating a wheel 14. The axle of the latter is provided with the usual driving cranks 15 on which the pedals 16 are rotatably mounted.

The invention resides in the provision of pedal extensions 17 which are applied to the pedals 16 and since the arrangement of the extensions at the two sides of the vehicle is the same, a description of the invention as applied to one pedal will suffice for both.

The extension 17 is generally in the form of a block and may be either solid or, as shown in the drawing, fabricated from a metal strap, suitably angulated as illustrated so that the extension possesses the required block form. Alternatively, the extension may be molded from plastic material so that it is block-shaped and hollow to eliminate unnecessary weight.

The extension is disposed at the top of the pedal 16, while a flat clamping plate 18 is positioned against the underside of the pedal. Suitable screws 19 extend through the clamping plate into threaded apertures formed in flanges 17a at the bottom of the extension, whereby to firmly clamp the pedal between the plate 18 and the extension and retain the extension in position on the pedal. The extension 17 and the plate 18 are somewhat wider than the pedal, whereby the screws 19 are disposed at opposite ends of the pedal and prevent any shifting of the extension relative to the latter.

A pair of longitudinally spaced, coaxial tubular members 20 are suitably secured to or formed integrally with the extension 17 at the top inside edge of the latter, that is, at the top edge of the extension adjacent the wheel 14, while the top outside edge of the extension is provided with an upwardly projecting rib or flange 21. Since both the rib 21 and the tubular members 20 project above the top surface of the extension, they effectively prevent the foot of the rider from sliding off in a lateral direction.

The tubular members 20 also serve to provide bearings for an angulated lower end portion 22a of a slidably telescoped connecting rod 22, the latter including a lower portion 22b and an upper portion 22c. The rod portion 22a is provided with a suitable fastening element such as a cotter pin 23 which is disposed between the tubular members 20 as shown in Figure 3 and prevents the rod portion 22a from sliding longitudinally therein.

The upper end portion of the rod member 22c is flattened and pivotally connected by a suitable pin 24 to a pair of spaced ears 25 provided at the underside of a clamp bracket 26. The bracket 26 is in the form of two complemental sections held together by a pair of screws 27 and secured to the aforementioned handle bars 12, as shown.

By virtue of the rotatability of the pedal 16 on the crank arm 15, the pivotal connection of the rod portion 22a to the extension 17 through the bearing members 20, and the pivotal connection of the rod portion 22c to the bracket 26 through the pin 24, the connecting rod 22 may oscillate about the pivot pin 24 while the pedal 16 is being actuated to turn the wheel 14, this action being further permitted by the slidable telescoping movement of the rod portions 22b and 22c themselves. It will be readily observed that the arrangement is such that the connecting rod 22 will effectively restrain the extension 17 and the associated pedal 16 so that at all times, regardless of the rotation of the crank 15 in the pedal, the pedal is so disposed that the extension 17 is at the top thereof, where it is readily available for contact by the rider's foot.

Thus, the extension needs to be provided only at the top of the pedal and the virtually negligible thickness of the plate 18 at the bottom of the pedal does not materially decrease the clearance which ordinarily exists between the pedal and the ground.

Obviously, extensions of various heights or thicknesses may be used as required to facilitate proper reach of the pedals by the feet of the rider, or alternatively, any suitable means may be provided for adjusting the height or thickness of the same extension in accordance with the reach of the feet as the child grows.

While in the foregoing there has been described and shown the preferred embodiment of the invention, various modifications may become apparent to those skilled in the art to which the invention relates. Accordingly, it is not desired to limit the invention to this disclosure and various modifications may be resorted to such as may lie within the spirit and scope of the appended claims.

What is claimed as new is:

1. The combination of a velocipede including a frame, a drive crank and handle bars provided on said frame, a pedal rotatable on said drive crank, an extension member provided solely on top of said pedal, means for securing said extension member to the pedal, and restraining means operatively connecting said extension member to said handle bars whereby to retain the pedal at all times in such position that the extension member is at the top thereof.

2. The device as defined in claim 1 wherein said restraining means comprise a slidably telescoped connecting rod pivotally attached to said extension member and to said handle bars.

3. The combination of a velocipede including a frame, a pair of drive cranks and handle bars provided on said frame, a pair of pedals rotatable on the respective drive cranks, a pair of extension members provided solely on top of the respective pedals, means for securing said extension members to the pedals, and a pair of slidably telescoped connecting rods pivoted at one end thereof to the respective extension members and pivotally connected at their other end to said handle bars, whereby to retain said pedals at all times in such position that said extension members are at the top thereof.

4. The device as defined in claim 3 together with brackets secured to said handle bars and having said connecting rods pivoted thereto.

5. Extension means for velocipede pedals, comprising a block-shaped extension member adapted for positioning on top of a pedal, a clamping plate provided at the underside of said extension member for securing a pedal between the extension member and said plate, a slidably telescoped connecting rod pivoted to said extension member, and a bracket pivoted to said rod and adapted to be secured to a portion of the velocipede which is relatively stationary with respect to the pedal, whereby to retain the pedal at all times in such position that the extension member is at the top thereof.

References Cited in the file of this patent

UNITED STATES PATENTS

| | | |
|---|---|---|
| 343,753 | Biggs | June 15, 1886 |
| 1,577,321 | Kurth | Mar. 16, 1926 |
| 2,548,988 | McDonald | Apr. 17, 1951 |

FOREIGN PATENTS

| | | |
|---|---|---|
| 453,342 | Great Britain | Sept. 9, 1936 |
| 343,850 | Italy | Oct. 16, 1936 |